United States Patent [19]

Nagaoka et al.

[11] Patent Number: 4,466,727
[45] Date of Patent: Aug. 21, 1984

[54] SHUTTER CONTROL CIRCUIT EQUIPPED WITH A FLASH LIGHT CONTROL SIGNAL CIRCUIT

[75] Inventors: Shinji Nagaoka; Koji Sato, both of Shikawatashi, Japan

[73] Assignee: Seiko Koki Kabushiki Kaisha, Tokyo, Japan

[21] Appl. No.: 343,197

[22] Filed: Jan. 27, 1982

[30] Foreign Application Priority Data

Feb. 23, 1981 [JP] Japan .................................. 56-25114

[51] Int. Cl.³ ...................... G03B 7/083; G03B 15/05
[52] U.S. Cl. ...................................... 354/417; 354/459
[58] Field of Search ........................ 354/33, 34, 51, 27

[56] References Cited

U.S. PATENT DOCUMENTS 4,255,030 3/1981 Johnson et al. ................. 354/33 X
4,268,138 5/1981 Coppa et al. .................... 354/34 X Primary Examiner—Michael L. Gellner
Attorney, Agent, or Firm—Robert E. Burns; Emmanuel J. Lobato; Bruce L. Adams

[57] ABSTRACT

A camera shutter utilizes a single photoelectric element in conjunction with a shutter control circuit for controlling the automatic exposure operation of the shutter in dependence on the integrated value of the ambient light received from an object field being photographed, and a flash control circuit for controlling the timing and duration of the flash in dependence on the total integrated value of the ambient light and flashlight received from the object field. The shutter control circuit effects control of the shutter operation before operation of the flash control circuit so that the automatic exposure operation and the flash operation are carried out in series. By such an arrangement, the flash system is operated within the time lag which occurs between the production of a shutter closing signal and the actual start of the shutter closing operation.

5 Claims, 4 Drawing Figures

SHUTTER CONTROL CIRCUIT EQUIPPED WITH A FLASH LIGHT CONTROL SIGNAL CIRCUIT

BACKGROUND OF THE INVENTION

This invention relates to a shutter control in the flash photographing mode of a camera equipped with an electronic shutter and capable of automatic exposure control and a flash light control circuit.

In photographing with a camera equipped with an automatic control type flash device (the so-called autostrobo), it is not necessary to provide any distance factor for the automatic control type flash device. The automatic control type flash device interrupts the duration of flashing when an appropriate flash quantity is detected by receiving the reflection of the flash on a photographing object by a photoelectric element provided for the flash device. Accordingly, it is necessary to provide a photoelectric element of a superior responsiveness for the flash device, while it is customary to provide a photoelectric element for the camera for automatic exposure control. Accordingly, it is advantageous to provide a photoelectric element of a superior responsiveness for the camera and make the photoelectric element serve also as the photoelectric element of the flash device. Such a system has already been employed by some cameras.

In the shutter control circuit of the present invention, a photoelectric element of a camera is adapted to serve both for controlling the shutter operation and for controlling the flash device. This invention relates particularly to a shutter control circuit suitable for daylight flash photographing (designated as "daylight synchro-flash photographing" hereinafter).

The exposure of the conventional camera in synchro-flash photographing has been controlled by integrating the sum of the quantity of the natural or ambient light (daylight) received from the object field and the quantity of the flash light received from the object field, and then simultaneously interrupting the flashing and providing a signal to close the shutter when the integrated quantity of the daylight and the flash light reach a predetermined given value. Accordingly, it has been necessary to actuate the flash trigger switch in synchronism with the start of exposure operation of the shutter, the adjustment of which has been very difficult. The application of an exposure control system such as described hereinbefore, in which the quantity of the daylight and the quantity of the flash light are integrated simultaneously, to a program lens shutter which opens in a controlled speed is accompanied by problems that the shutter does not open due to the excessively intensive reflection of the flash when the object is located very near to the camera and that the efficiency of the flash is reduced resulting from the arrival of the peak flash timing before the shutter full opening timing when the object is located far from the camera.

SUMMARY OF THE INVENTION

The present invention has as its object to provide a shutter control circuit which is capable of overcoming the aforesaid disadvantages in known shutter control circuits. According to the present invention, the exposure operation of a program shutter in daylight synchro-flash photographing is controlled in the automatic exposure control (AE) mode for the natural lighting while the flashlight is added effectively as an auxiliary light for rear light photographing.

In the embodiments of the present invention light sensing means in the form of, a photoelectric element such as a silicon photodiode which exhibits superior responsiveness is used for detecting the object field brightness. In the daylight synchro-flash photographing as described hereinbefore, for instance, the shutter operating time is controlled by an integrating circuit comprising a timing condenser, and an output current of the photoelectric element corresponding to the field brightness by a system similar to the system employed generally in the conventional AE control circuit. Furthermore, the operation of the integrating circuit is interrupted temporarily when a shutter closing signal is provided and restarted simultaneously with the triggering of the flash after mechanical or electrical delaying, and then the flashing is stopped when the quantity of the reflection of the flashlight reaches a predetermined quantity of light. Generally, there is a time-lag between the provision of the shutter closing signal and the start of the shutter closing operation. The actuation of the flash system and the flashlight control are performed within the time-lag.

Accordingly, in the case of daylight synchro-flash photographing, the shutter is controlled solely on the basis of the natural light independently of the flashlight and the flashlight which is controlled on the basis of the reflection is used as auxiliary light, thus the object of the present invention is attained.

DETAILED DESCRIPTION OF THE INVENTION

The embodiments of the present invention will be described hereinafter referring to the attached drawings.

Figure 1:
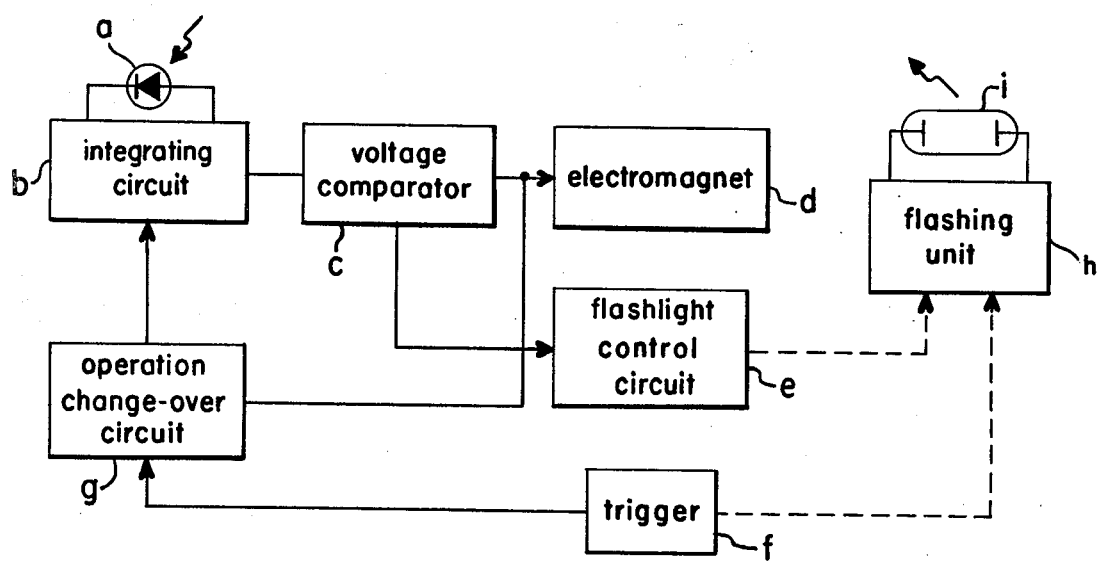
FIG. 1 is a block diagram of a shutter control circuit according to the present invention.

In FIG. 1, the output of a photoelectric element a corresponding to the brightness of the object is applied to an integrating circuit b. An integrating circuit for shutter control and an integrating circuit for flashlight control may be provided individually, however, the circuit construction is simplified when a single integrating circuit b is used for both purposes since the functions of the two integrating circuits are entirely same. A voltage comparator c compares the output of the integrating circuit b with a reference potential and provides a detection signal. The integrating circuit b and the voltage comparator c comprise shutter control circuit means for controlling the shutter operation. This detection signal is applied to an electromagnet d in the shutter control mode as a shutter closing signal, whereas it is applied to a flashlight control circuit e in the flashlight control mode. The detection signal of the voltage comparator c is applied to an operation changeover circuit g to interrupt temporarily the operation of the integrating circuit b as a shutter control circuit. The trigger f of a flashing unit h is actuated in synchronism with the start of closing of the shutter. In general, this synchronous operation is caused by the mechanical closing of a switch, however, a circuit output delayed slightly from the shutter closing signal can be employed in this synchronous operation, which will be described afterward. The operation of the integrating circuit b is restarted by the functioning of the operation change-over circuit g simultaneously with the start of flashing caused by the trigger f, so that the flashlight control operation is attained. A signal is sent from the flashlight control circuit e to a flashing stopping circuit along a path as shown by broken lines. The flashing stopping system may be either a system comprising a by-pass discharge tube connected in parallel to a main discharge tube or a system comprising a semiconductor switching element connected in series to a main discharge tube.

Thus, the present invention is characterized in the dual uses of a single photoelectric element for controlling the shutter operation as well as for flashlight control after the shutter control has been completed.

Figure 2:
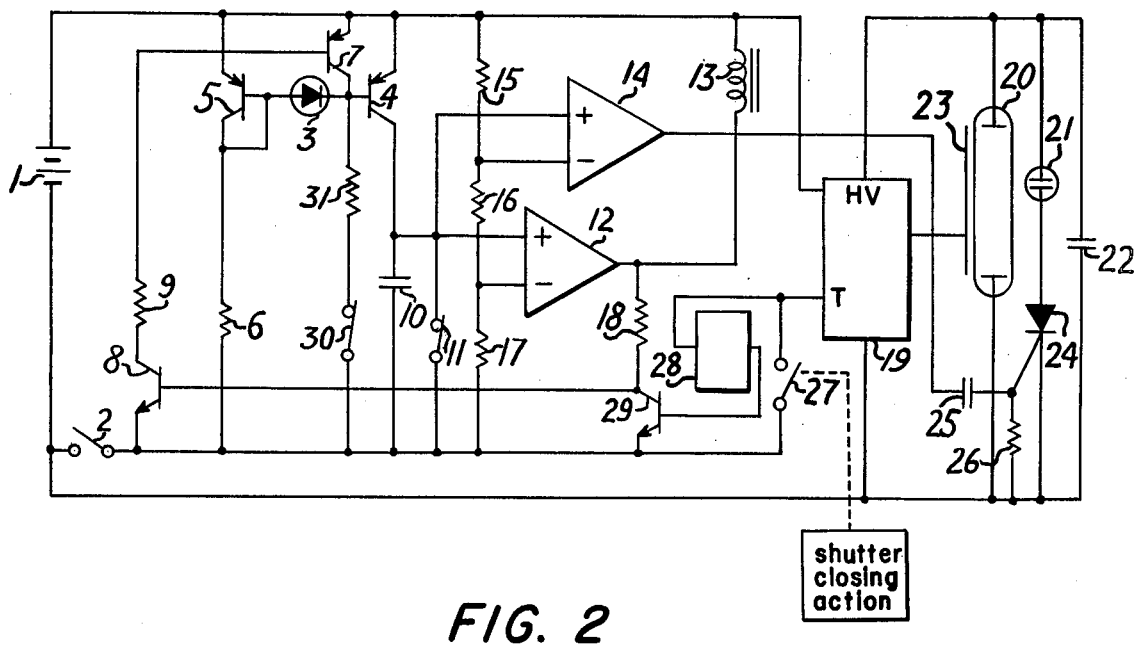
FIG. 2 is a view illustrating a shutter control circuit according to the present invention.

In the embodiment of the present invention as shown in FIG. 2, the circuit comprises a power source 1, a power switch 2, a photoelectric element 3 connected between the bases of transistors 4 and 5. The transistor 5 is of a diode constitution with the base-collector path grounded. A resistor 6 functions as a bias resistor. Transistors 7 and 8 and a resistor 9 are the transistors and resistor of a switching circuit for controlling the operation of the transistor 4. A timing condenser 10 for integrating is connected to the collector of the transistor 4. A timing switch 11 is connected in parallel to the condenser 10. A voltage comparator 12 is used for controlling the shutter. An electromagnetic 13 is connected to the output terminal of the voltage comparator 12 for controlling the closing operation of the shutter. A reference numeral 14 designates a voltage comparator for controlling the flashing. The positive input terminals of the two comparators are connected to the junction between the condenser 10 and the transistor 4. The negative terminals of the two comparators are connected to a point divided by breeder resistors 15, 16 and 17. A resistor 18 is connected to the output terminal of the comparator 12 and the base of the transistor 8. A flash circuit block 19 includes a part of the flashing unit. A high voltage output terminal HV provided by a DC/DC converter is connected to a main discharge tube 20, a by-pass discharge tube 21 and a main condenser 22. A reference numeral 23 designates a trigger electrode. An SCR 24 is connected in series to the by-pass discharge tube 21 and the gate terminal thereof is connected to a condenser 25 and a resistor 26 which comprise a differentiation circuit. The SCR is controlled by the output of the comparator 14. A flash trigger switch 27 is connected to a T-terminal of the flash circuit block 19 and an FF circuit 28 holds or latches the signal provided by the trigger switch 27 and is adapted to be reset when the power source is switched off. A transistor 29 is driven by the output of the FF circuit 28 so as to control the operation of the transistor 8. A switch 30 is closed when the flash unit is used. A resistor 31 provides a given bias to the transistor 4 when the switch 30 is closed.

Figure 3:
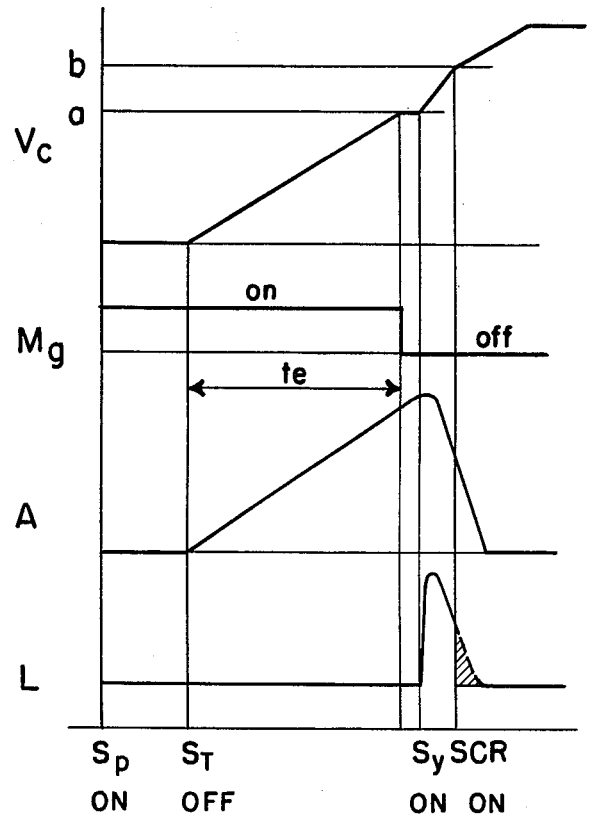
FIG. 3 is a waveform diagram for facilitating the description of the operation of the shutter control circuit of FIG. 2.

The manner of operation of the circuit will be described hereinafter referring to the waveform diagram of FIG. 3. In FIG. 3, VC indicates the waveform of the terminal voltage of the condenser 10, a and b indicate the negative input voltage of the comparator 12 and the negative voltage of the comparator 14 respectively. Marks Mg, A and L indicate the operating diagram of the electromagnet 13, the waveform of the area of the shutter opening, and the waveform of the flashlight intensity respectively.

With the main condenser 22 charged and the flash unit ready for flashing, the power switch 2 is closed as the release button of the camera is depressed so that electricity is supplied to the circuits. This state is shown by Sp ON in FIG. 3. As the release button is depressed further, the shutter is released and allowed to start opening, simultaneously, the timing switch 11 is opened. The timing condenser 10 is charged gradually by a constant current controlled by the transistor 4. This state is shown by the waveform after St OFF in FIG. 3. When the charging voltage exceeded the voltage a which is set as the negative input of the comparator 12, the comparator 12 is inverted to cut off the electromagnet 13 so that the shutter starts the closing operation. The conversion signal switches on the transistor 8 through the resistor 18, thereby the transistor 7 also is switched on so that the transistor 4 controlling the constant current is switched off. At this moment, the charging of the condenser 10 is interrupted, which is shown by a waveform extending in parallel to the axis of the abscissa. The base current of the transistor 4 is determined by the photoelectric element 3. When the brightness of the object is at a high level, the photoelectric element 3 generates an increased electric current, therefore, an increased electric current is controlled by the transistor 4 so that the condenser 10 is charged within a reduced time. Thus a shutter speed te corresponding to the brightness of the object is determined. Simultaneously with the start of the closing operation of the shutter, the flash trigger switch (Sy) 27 is switched on so that the flash unit flashes. At the same time, the signal of the trigger switch 27 is latched through the FF circuit 28 and the transistors 8 and 7, which have been closed, are switched off resulting from the switching-on of the transistor 29. Then, the transistor 4 is switched on again and the photoelectric element 3 receives the reflection of the flashlight on the object so that the condenser 10 is charged by the electric current controlled corresponding to the quantity of the reflection received by the photoelectric element 3. When the charging voltage exceeded the voltage b given as the negative input of the comparator 14, the comparator 14 is inverted so that the SCR is switched on through the differentiation circuit connected to the output terminal of the comparator 14. Consequently, the by-pass discharge tube 21 is caused to discharge instantaneously so that the flashing is interrupted. This series of flashing operations are completed in a short period of time after the shutter closing signal has been provided before the shutter is closed. The resistor 31 is connected through the switch 30 to the base of the transistor 4 and the negative line of the power source to limit the exposure time within a time safe from camera-shake, since the exposure time te is extended over a necessary time when the brightness of the object is extremely low.

Figure 4:
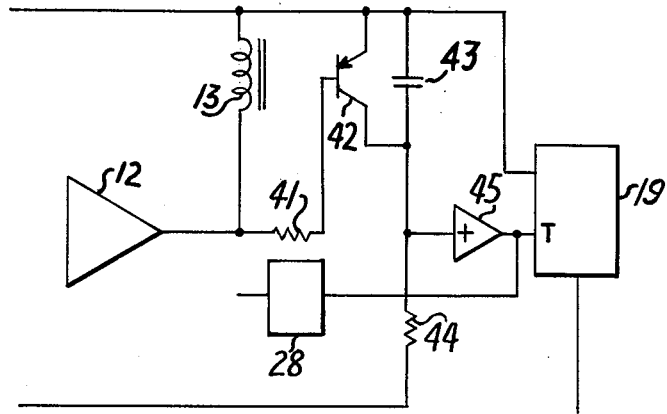
FIG. 4 is a view illustrating another shutter control circuit according to the present invention, wherein a part of the circuit of FIG. 2 is replaced with a different circuit.

The embodiment of FIG. 4 will be described hereinafter. Only that part of the circuit which is different from that of the embodiment of FIG. 2 is shown in FIG. 4. The rest of the circuit is omitted for simplicity, since it is the same as the corresponding part of the circuit of FIG. 2. In FIG. 4, reference numerals designate; 41: a resistor connected between the base of a transistor 42 and the output terminal of a comparator 12, 43 and 44: a condenser and a resistor, respectively, for determining the delay time, and 45: a voltage comparator for detecting the charging voltage of the condenser 43. The output terminal of the voltage comparator 45 is connected to the trigger terminal T of a flashing control circuit 19. In operation, when a shutter closing signal is provided, namely, when the comparator 12 is inverted and the output thereof is changed from a low level to a high level, the transistor 42 is switched off. Consequently, the condenser 43 is charged through the resistor 44. When the positive input of the comparator 45 is reduced below the internally set voltage of the comparator 45, the output is inverted from a high level to a low level so that the flash unit is triggered and the FF circuit 28 is driven. The flash unit is triggered after a delay time after the shutter closing signal has been provided to facilitate the synchronization of the flashing with the shutter operation when the brightness of the object is in a high level.

In the embodiments of the present invention as described hereinbefore, the condenser 10 which integrates the photoelectric output is used both for controlling the shutter operation and for controlling the flashing and two individual voltage detecting comparators are employed, however, such constitution is not limited by the substance of the present invention, but only the photoelectric element 3 may be used both for controlling the shutter operation and for controlling the flashing and the rest of the processing circuits may be provided individually. Furthermore, the circuits of the present invention may be constituted by replacing the two comparators with a single comparator.

It is obvious from what has been described hereinbefore that according to the present invention, flash photographing, particularly effective in daylight synchroflash photographing, is possible through the use of a single photoelectric element both for controlling the shutter operation and for controlling the flashing and the control of the flashing between the completion of the shutter control and the completion of the shutter closing. This invention is applicable also to a camera equipped with a program lens shutter, which opens gradually at a controlled rate, without reducing the flashing efficiency. Furthermore, the use of a single photoelectric element for the dual purposes simplifies the circuit constitution, reduces the total cost by reducing the number of parts of the circuits and simplifies the adjusting process.

We claim:

1. In a photographic camera having a triggerable flash system and operable in an automatic flash exposure mode for automatically controlling the exposure operation of a shutter in dependence on the light received from an object field being photographed: light sensing means for sensing the light received from the object field and producing a corresponding output current signal proportional to the object field brightness; shutter control circuit means for integrating the output current signal and producing a shutter closing signal to initiate closing of the shutter in dependence on the integrated value of the output current signal attributable to ambient light received from the object field to thereby control the shutter operation; and flash control circuit means responsive to the shutter closing signal for temporarily interrupting the integration of the output current signal and thereafter effecting resumption of the integration of the output current signal in synchronism with the triggering of the flash system and operative to control the flash operation in dependence on the integrated value of the output current signal attributable to both ambient light and flashlight received from the object field.

2. A photographic camera according to claim 1; wherein the shutter control circuit means comprises an integrating circuit for integrating the output current signal, and comparator means for comparing the integrated value with a reference value and producing the shutter closing signal in response to a favorable comparison.

3. A photographic camera according to claim 2; wherein the flash control circuit means includes an operation change-over circuit responsive to the shutter closing signal for temporarily disabling the integrating circuit, and a flashlight control circuit for controlling the flash operation in dependence on the integrated value of the output current signal attributable to both ambient light and flashlight received from the object field.

4. A photographic camera according to claim 2; wherein the comparator means comprises a first comparator for detecting a first integrated value to control the shutter operation, and a second comparator for detecting a second integrated value to control the flash operation.

5. A photographic camera according to claim 1; including a delay circuit for delaying the resumption of the integration of the output current signal for a predetermined time after production of the shutter closing signal.

* * * * *